United States Patent [19]
Stimler

[11] 3,735,140
[45] May 22, 1973

[54] LOW LIGHT LEVEL LASER IMAGING SYSTEM

[75] Inventor: Morton Stimler, Rockville, Md.

[73] Assignee: The United States of America as represented by the Secretary of the Navy, Washington, D.C.

[22] Filed: June 25, 1970

[21] Appl. No.: 49,640

[52] U.S. Cl. ............... 250/213 VT, 313/91, 350/160
[51] Int. Cl. .............................................. H01j 31/50
[58] Field of Search ...................... 250/213 VT, 83 R, 250/83 H, 80; 313/91, 92; 350/66, 160; 23/230 LC; 178/7.7

[56] References Cited

UNITED STATES PATENTS

| | | |
|---|---|---|
| 3,142,760 | 7/1964 | Iams.............................. 250/213 VT |
| 3,379,998 | 4/1968 | Soules et al. ......................... 331/94.5 |
| 3,499,157 | 3/1970 | Satake et al. ..................... 250/213 VT |
| 3,500,237 | 3/1970 | Myers et al. ........................ 331/94.5 |
| 3,544,711 | 12/1970 | DeBitetto ......................... 350/160 X |
| 3,253,497 | 5/1966 | Dreyer.............................. 313/91 X |

Primary Examiner—Walter Stolwein
Attorney—R. S. Sciascia and J. A. Cooke

[57] ABSTRACT

A low light level imaging system having an image intensifier which utilizes a semiconductive material. A photoemissive material emits spatially modulated electrons in response to a detected image to spatially modulate the reflectivity of the semiconductive material. A laser beam from a laser located external to the image intensifier is reflected from the modulated semiconductor reflector to provide an image on a screen.

7 Claims, 4 Drawing Figures

INVENTOR
Morton Stimler

LOW LIGHT LEVEL LASER IMAGING SYSTEM

BACKGROUND OF THE INVENTION

This invention relates generally to the art of image intensification and, more particularly, to a low light level laser imaging system.

Image intensification has been widely used in both military and civilian applications varying from target detection to crime prevention. Heretofore employed image intensifiers generally have included an optical device that focuses a low intensity target image, or the like, on a layer of photoemissive material. Electrons released by the photoemissive material in response to the impinging light image projected thereon are spatially modulated in the form of the low intensity target image. These electrons are accelerated through a high potential field, focused by an electron lens, and impinge on a luminescent screen, such as a phosphor or the like, to provide an intensified target image.

These heretofore employed conventional image intensifier devices utilizing phosphor luminescent screens are, however, unsatisfactory in some respects. For example, increases in the sensitivity of such devices provided by increasing the electron accelerating potential are limited by secondary electron emissions from the luminescent screen material which cause the intensified image to lose its contrast and become blurred. Another limitation is the undesirable image persistence of available phosphorous screens which renders the observation and tracking of moving targets somewhat difficult. A still further disadvantage of conventional image intensifiers utilizing phosphorous screens is that the phosphor screens contain toxic materials which necessitate extreme care in assembly of the device and present a safety hazard in case of breakage thereof.

An image intensifier which converts a target image at low light to an intensified image without using a phosphorous or other luminescent screen is disclosed in U.S. Patent application Ser. No. 889,445, filed Dec. 31, 1969, by Morton Stimler. A modified conventional electron image intensifier is disclosed therein which utilizes a spatially modulated semiconductor material in lieu of the phosphor screen. The semiconductor possesses variable or modulatable reflectivity and is utilized as an end reflector of a conjugate resonator laser cavity. The change in reflectivity of the semiconductor material responsive to the target image thereon causes the cavity to spatially laze to provide a target image at the laser output. If the thickness of the semiconductor material is specifically chosen, the image will be intensified in relation to the low level intensity of the sensed target.

The laser image intensifier disclosed in the heretofore identified patent application is adequate for most applications and eliminates the disadvantages of conventional phosphor screen image intensifiers discussed hereinbefore. There are, however, some features of the intensifier which may render it unsuitable for some applications. For example, since the intensifier disclosed in the heretofore identified patent application includes a conjugate resonator laser cavity internal to the intensifier system, the geometric configuration of the system is somewhat constrained. Similarly, since the laser is in a direct alignment with the sensed target, the system is more prone to detection by the target than if the laser were external to the intensifier and not in alignment with the target. Still furthermore, since the intensifier operates by Q-switching which causes the laser to laze, the change in reflectivity of the semiconductor is quite critical, that is, a reflectivity must be reached upon sensing a target which causes the laser to laze. The thickness of the semiconductor material is also highly critical for providing proper image intensification.

SUMMARY OF THE INVENTION

Accordingly, one object of this invention is to provide a low light level laser imaging system.

Another object of the present invention is to provide a low light level laser imaging system of greatly improved sensitivity.

Yet another object of the present invention is to provide a low light level laser imaging system which is non-toxic.

Still another object of the instant invention is to provide a low light level laser imaging system wherein the laser is external to the image intensifier.

A further object of the invention is to provide a low light level laser imaging system which is free from constraining geometric configurations.

Another object of the instant invention is to provide a covert low light level laser imaging system.

Briefly, these and other objects of the present invention are attained by a low light level image intensifier utilizing a semiconductive material, or the like, which is spatially modulated by a detected target image and varies in reflectivity in response thereto. A spatially filtered and collimated source of light, such as provided by a laser, impinges on the semiconductor material to enhance the detected image.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
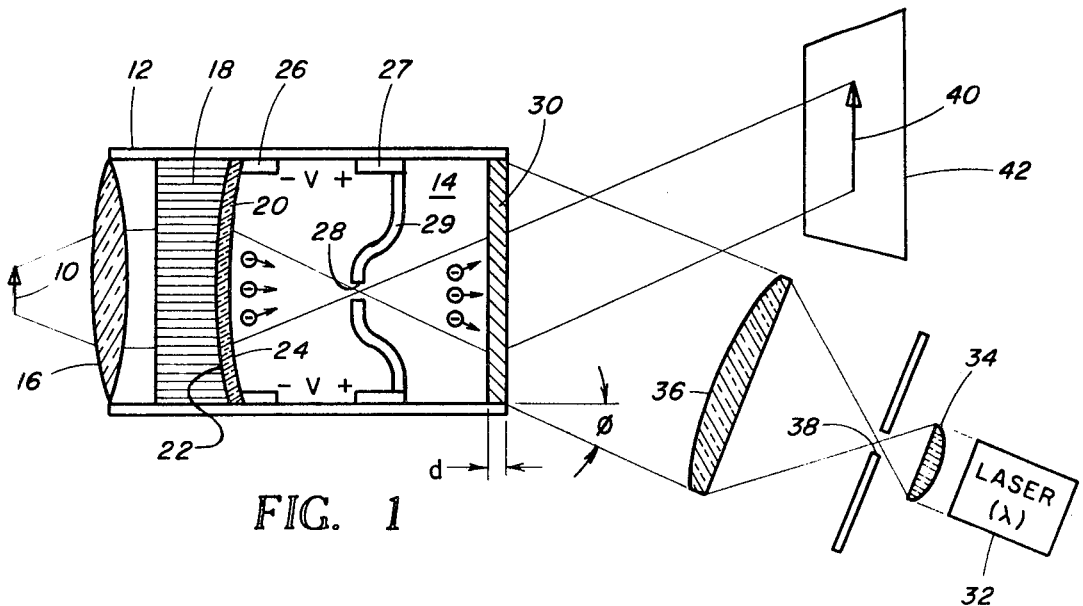
FIG. 1 is a schematic view, partly in section, of the low light level laser imaging system according to the present invention.

Referring now to the drawings wherein like reference numerals designate identical or corresponding parts throughout the several views and, more particularly, to FIG. 1 thereof wherein the laser imaging system according to the present invention for detecting a low light level target, or the like, shown schematically at 10 is shown as including a cylindrical housing 12 enclosing an image intensifier 14 having at one extremity a target imaging lens 16 for focusing light reflected from target 10 into the intensifier. It is readily apparent that imaging lens 16 may be replaced by a telescope or other suitable optical system adapted to focus a light image of the target into the image intensifier.

The optical image of target 10 is focused by lens 16 onto a conventional fiber optics material or rods 18 disposed in housing 12 which transmits the focused image to a photoemissive screen or element 20 positioned in housing 12 and having surfaces 22 and 24. Surface 22 of photoemissive element 20 abuts fiber optics material 18. It will be appreciated that the fiber optics may be eliminated and the target image may be focused directly on the photoemissive material. Light photons, transferred by fiber optics 18 onto surface 22 in response to the impinging target image, causes electrons to be emitted from surface 24. The electrons so emitted by the photoemissive material are spatially modulated, that is, have a density which corresponds to the intensity of the target image transferred by the fiber optics. The spatially modulated electrons are accelerated, through a high potential field V applied between electrodes 26 and 27 located within housing 12, toward a focusing aperture 28 formed centrally of electrode extensions 29 which form a conventional electron lens, and are projected, still spatially modulated, onto a modulatable element 30 located at the other extremity of housing 12. It is readily apparent that while the electron lens, formed by electrode extensions 29, is funnel-like in shape, other geometrically shaped electron lenses may be utilized. Furthermore, while electrodes 26 and 27 are shown as completely within housing 12, it is readily apparent that the electrodes may form a part of housing 12.

Modulatable element 30, rather than being formed of a phosphorous or luminescent material as used in conventional image intensifiers, is comprised of a semiconductive material, such as, for example, lead telluride, lead sulfide, lead selinide, or any equivalent material of a thickness adapted to provide an increase in reflectivity in regions of minority carrier injection. That is, the reflectivity of modulatable semiconductive element 30 varies in direct proportion to the density of electrons impinging on a particular area of its surface. Thus, since photoemissive material 20 emits greater quantities of electrons in areas where brighter light images are focused on it, the electrons so emitted are accelerated and focused on modulatable semiconductive element 30 causing it to be more reflective in areas corresponding to brighter target image areas. An image of target 10 is therefore formed on semiconductive element 30 as a varied reflectivity pattern, the pattern so formed retaining substantially the same shading and contrast as seen by imaging lens 16.

A conventional laser 32 is located external to image intensifier 14 and is adapted to supply light which is incident on semiconductor 30 at an angle $\phi$. By positioning laser 32 external to the image intensifier and off the longitudinal axis of housing 12, the possibility that the target may "see" the laser is greatly reduced and, therefore, a more covert imaging system is provided which is desirable if the system is used for surveillance or other military applications. The light incident on the semiconductor is spatially filtered and expanded by lenses 34 and 36 and by an aperture 38 to remove inhomogeneities in the laser beam cross-section which would otherwise be present. As hereinafter more fully explained, an expanded beam is advantageous if it is desired to visually observe a target image 40 on a screen 42 or the like.

The low light level imaging system according to the present invention makes use of two characteristics of semiconductor 30 to provide an intensified target image 40 on screen 42. The first characteristic, heretofore mentioned, is that the reflectivity, which may be defined as the ratio of reflected to incident intensity at the surface of a material only, is spatially modulated by the injection of electrons from photoemissive material 20. Thus, semiconductor material 30 will reflect light incident thereon to a greater degree where the material is spatially modulated than elsewhere on the material. The second characteristic is that of reflectance, which may be defined as the ratio of reflected to incident intensity at the surface including multiple reflections from inner surface boundaries, which is an interference effect. By utilizing changes in reflectance of semiconductor 30, as well as changes in reflectivity of the semiconductor, a substantial image amplification is attained.

More particularly, the semiconductor thickness d is so chosen so that the reflectance of the semiconductor ranges from a minima to a maxima to light from laser 32 is incident on the semiconductor. Thus, the semiconductor thickness $d$ must be chosen to provide a change in reflectance from a minima to a maxima for radiation from laser 32.

Figure 2:
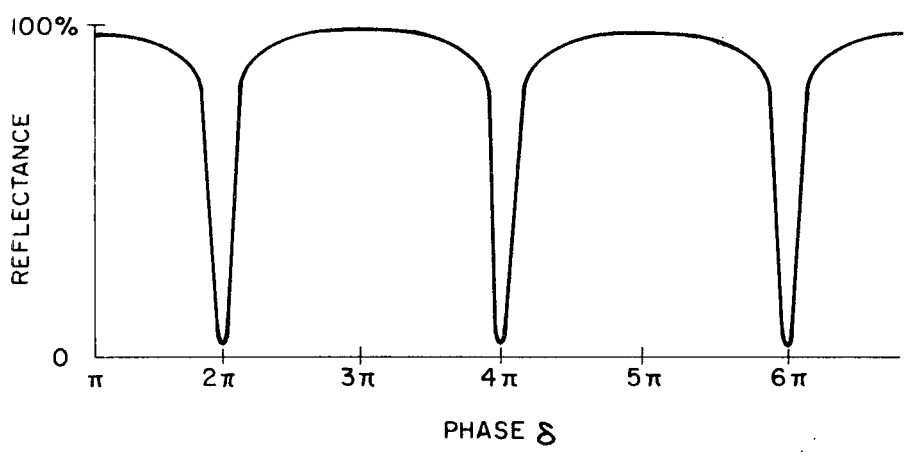

When incident radiation of wavelength $\lambda$, wherein $\lambda$ is the wavelength of laser 32, strikes semiconductor 30, there is a phase change of $\pi$ radians on reflections from the first surface and an additional phase change due to the additional optical path length travelled by that radiation which is reflected from the second surface. The additional optical path length, q, is given by the relation:

$$q = 2nd/\cos\phi' \quad (1)$$

wherein n is the index of refraction of the semiconductor, d is the semiconductor thickness and $\phi'$ is given by Snell's Law $n \sin\phi' = \sin\phi$ where $\phi$ is the angle the incident radiation makes with a normal to the semiconductor surface outside the semiconductor as shown in FIG. 1. The phase change, $\delta$, in radians, due to the added path length q is illustrated in FIG. 2 as a function of reflectance. As indicated therein, minimum reflectance occurs at phase changes of $$\delta = 2p\,\pi \text{ (minima) } p = \text{integer}$$

(2)

while maximum reflectance is given by the relation:

$$\delta = (2p + 1)\,\pi \text{ (maxima)}, p = \text{integer}$$

(3)

Relatively small index of refraction changes which produce small changes in $\delta$ and small changes in reflectivity, nonetheless, produce relatively large changes in reflectance of certain semiconductor materials.

The added path length requirement for minimum reflectance at incident radiation $\lambda$ is given by the relation $$q = p\,\lambda \text{ (minima) } p = \text{integer}$$

(4)

From equation (1) and (4), the semiconductor thickness that will yield minimum reflectance is given by $$d = (p\,\lambda\,\cos\phi')/2n \text{ (minima)}$$

(5)

The thickness for d is not exclusive, however. Thus, the optimum value of $d$ must yet be found.

Figure 3:
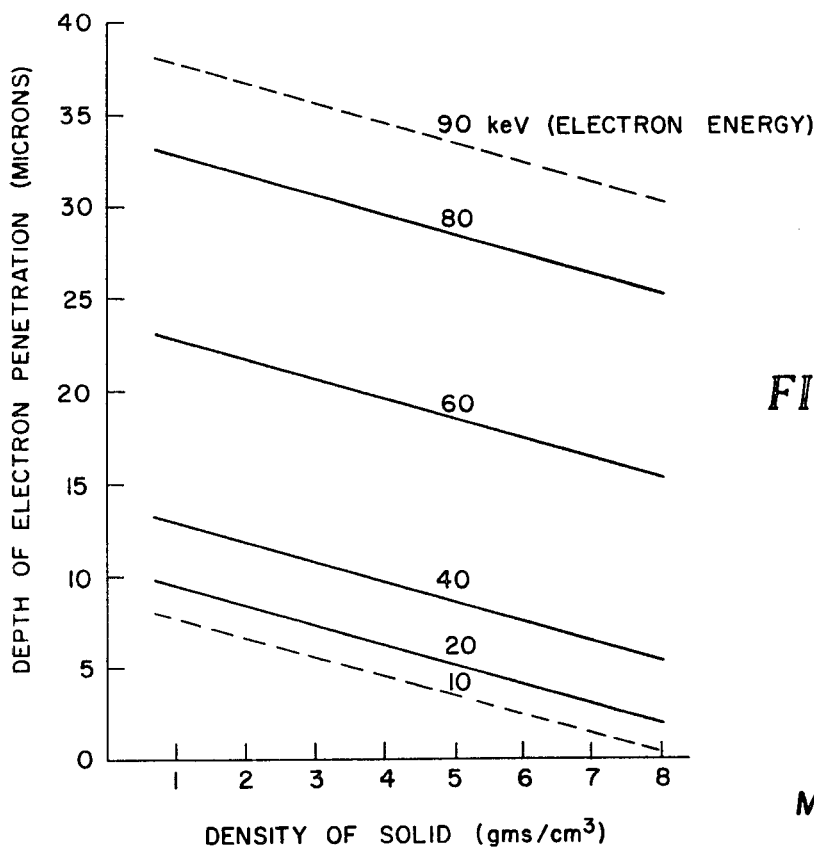
FIGS. 2–4 are graphical diagrams of various parameters associated with the system of FIG. 1.

The change in optical path length between maximum and minimum reflectance is given by the relation $$q\text{ max} - q\text{ min} = (2t\,\Delta\,n)/\cos\phi'$$

wherein $t$ is the electron penetration depth, $\Delta n$ is the change in index of refraction. FIG. 3 illustrates a family of curves which shows electron penetration depth, $t$, as a function of density of the semiconductor with electron energy as a parameter. In general, the electron energy and the density of semiconductor 30 will be known. To find the optimum thickness $d$, the electron penetration depth is determined from FIG. 3 and substituted for $d$ in equation (5) is then used to solve for $p$, which is an integer, and then this value of $p$ is used to solve for $d$ which is the optimum thickness that provides an optimum change in reflectance, from a minima to a maxima, to incident radiation of wavelength $\lambda$.

Figure 4:
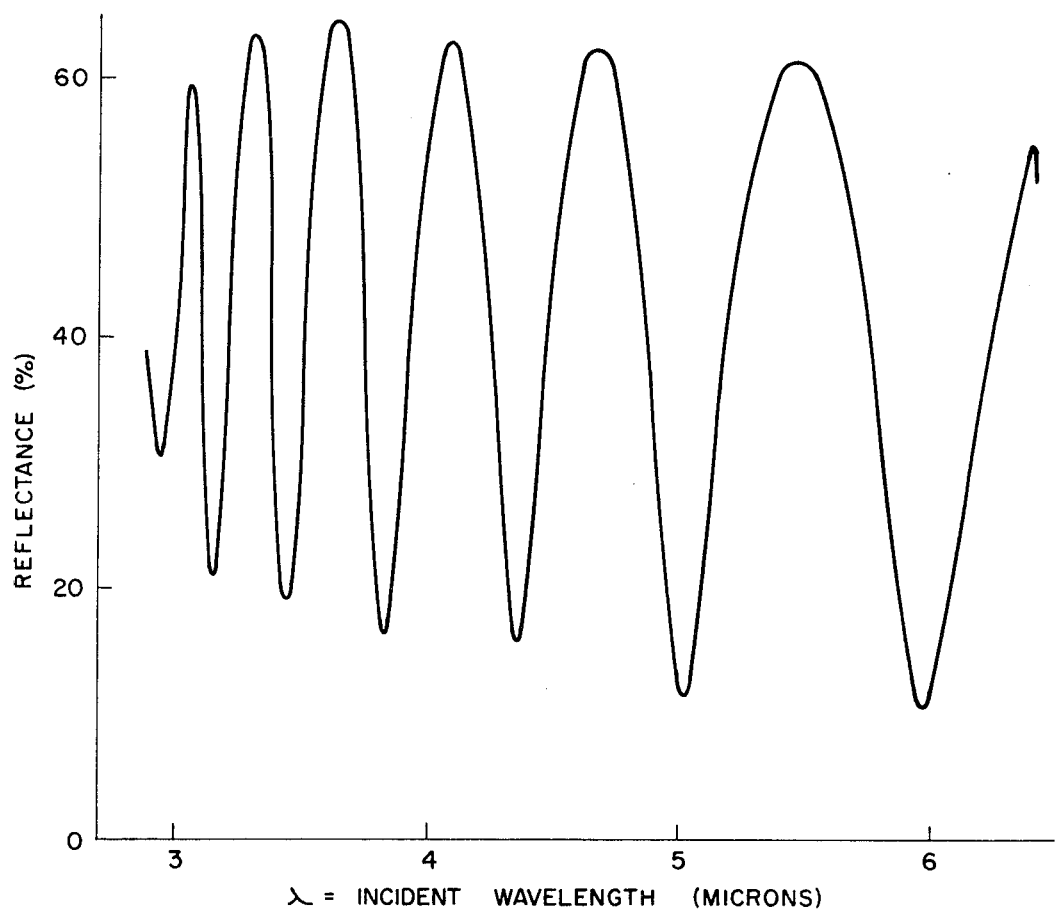

To illustrate this procedure for a typical material, the calculations for a lead salt semiconductor, PbS, follows. Referring to FIG. 4 of the drawing, a spectrometer plot of reflectance versus wavelength for a PbS film is shown. As shown therein, changes in reflectance of over 50 percent may be obtained for wavelengths of laser 32 from about 3 to about 6.5 microns. Consider an appropriate laser wavelength within this range of $\lambda = 3.39\mu$ and also assume $\cos\phi' \approx 1$, that is, assume laser 32 supplies radiation which is approximately perpendicular to semiconductor 30. From any known text or the like on semiconductors, the density of PbS is found to be 7.6 gm/cm³ and the index of refraction for radiation of $3\mu$ is $n = 4.10$. Assuming an electron energy of 20 keV, which depends on the magnitude of the potential field applied between electrodes 26 and 27 in FIG. 1 and may be predetermined, the electron penetration is found from FIG. 3 to be about $3.7\mu$. Substituting the electron penetration depth for $d$ in equation (5) and solving for $p$ which must be an integer yields.

$$p = (2nd/\cos\phi') \rightarrow 9.$$

Substituting $p = 9$ into equation (5) and solving for $d$, which had heretofore been estimated by electron penetration, shows that the optimum thickness of semiconductor 30 is $d = 3.72\mu$. This value of semiconductor thickness satisfies the minimum reflectance requirement with a phase change of $\delta = 18\pi$. Additionally, since the thickness of the semiconductor is approximately equal to the electron penetration depth, problems of absorptive losses within the semiconductor are minimized. Table I illustrates thicknesses for various semiconductor materials calculated as hereinabove.

TABLE I

| Material | Density (gm/cm³) | Index of Refraction, n | Penetration Depth, ($\mu$) | P | Optimized Thickness, d($\mu$) |
|---|---|---|---|---|---|
| PbTe | 8.25 | 5.35 | 1.80 | 6 | 1.90 |
| PbS | 7.597 | 4.10 | 3.70 | 9 | 3.72 |
| PbSe | 8.273 | 4.59 | 1.82 | 5 | 1.85 |

$\cos\phi = 1$
V = 20Kv

The operation of the low light level imaging system may best be understood by reference to FIG. 1. As hereinbefore explained, a target 10 is sensed by imaging lens 16 and the image thereof is transferred to photoemissive material 20 via fiber optics 18. The photoemissive material responds to the image by providing spatially modulated electrons which are emitted from the photoemissive material, accelerated by the potential between electrodes 26 and 27 through focusing aperture 28 of the electron lens, and land incident to semiconductor 30. The electrons emitted from photoemissive material 20 spatially modulate the reflectivity of semiconductor 30 thereby providing an increased reflectivity and reflectance proportional to the target image.

Additionally, if the thickness d of the semiconductor is properly chosen, spatially filtered and expanded radiation of wavelength $\lambda$ provided by laser 32 incident to semiconductor 30 will be reflected in accordance with the spatially modulated reflectance of the semiconductor to produce an image of the target 40 which may be viewed on screen 42. Thus, the effect of increased reflectivity and of increased reflectance provides an amplified or intensified target image.

Obviously, numerous modifications and variations of the present invention are possible in light of the above teachings. Thus, while the various thicknesses have been calculated for $\phi = 0°$ corresponding to $\cos\phi' = 1$, it is readily apparent that a different angle of incidence may be chosen as desired. The new value of $\cos\phi'$ is then used in calculating the optimized thickness. Similarly, it may be desirable to keep the thickness of the semiconductor relatively constant and obtain the optimum reflectance change by varying the angle $\phi$ thereby providing greater flexibility in thickness requirement. It is therefore to be understood that within the scope of the appended claims, the invention may be practiced otherwise than as specifically described herein.

What is claimed as new and desired to be secured by Letters Patent of the United States is:

1. An imaging system comprising:
   an image intensifier including a semiconductive material possessing a variable reflectivity and a variable reflectance and having the characteristics of increasing its reflectance in proportion to the density of electrons impinging upon it, and further including photoemissive means for spatially varying the reflectivity of said material in response to impingement of a detected image upon said photoemissive means, and
   light means external to said image intensifier for providing an intensified image of said detected image proportionate to the reflection of said material.

2. An imaging system according to claim 1 further comprising
   means for accelerating said spatially emitted electrons, and
   means for focusing said accelerated spatially emitted electrons onto said semiconductive material.

3. An imaging system according to claim 2 wherein said means external to said image intensifier for providing the image proportionate to the reflectance of said material is a means for providing radiation of a predetermined wavelength incident to said semiconductive material.

4. An imaging system according to claim 3 wherein the reflectance of said semiconductive material varies from a minima to a maxima.

5. An imaging system according to claim 4 wherein the variation of reflectance of said semiconductive material is dependent upon the thickness of said semiconductive material.

6. An imaging system according to claim 5 wherein the thickness, d, of said semiconductive material is given by the relation:

$$d = (p \lambda \cos \phi')/2n$$

wherein $p$ is an integer, $\lambda$ is said predetermined wavelength, $\phi'$ is the angle said radiation makes with a normal in said semiconductive material, and n is the index of refraction of said semiconductive material.

7. An imaging system according to claim 3 wherein said means for providing radiation of a predetermined wavelength is a laser.